US 11,544,121 B2

(12) United States Patent
LeBeane et al.

(10) Patent No.: US 11,544,121 B2
(45) Date of Patent: Jan. 3, 2023

(54) GPU NETWORKING USING AN INTEGRATED COMMAND PROCESSOR

(71) Applicant: Advanced Micro Devices, Inc., Sunnyvale, CA (US)

(72) Inventors: Michael Wayne LeBeane, Austin, TX (US); Khaled Hamidouche, Austin, TX (US); Walter B. Benton, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/815,043

(22) Filed: Nov. 16, 2017

(65) Prior Publication Data
US 2019/0146857 A1 May 16, 2019

(51) Int. Cl.
*G06F 9/54* (2006.01)
*H04L 61/10* (2022.01)
*G06F 9/30* (2018.01)
*G06F 15/76* (2006.01)

(52) U.S. Cl.
CPC ............ *G06F 9/542* (2013.01); *G06F 9/3009* (2013.01); *G06F 9/546* (2013.01); *H04L 61/10* (2013.01); *G06F 2015/765* (2013.01)

(58) Field of Classification Search
CPC ........ G06F 9/542; G06F 9/3009; G06F 9/546; G06F 2015/765; H04L 61/10
See application file for complete search history.

(56) References Cited

U.S. PATENT DOCUMENTS

| 8,004,533 | B2 | 8/2011 | Huang et al. |
| 9,602,437 | B1 * | 3/2017 | Bernath .............. H04L 49/3054 |
| 2014/0149528 | A1 | 5/2014 | Vandavaart et al. |
| 2017/0180272 | A1 * | 6/2017 | Bernath .............. H04L 49/3054 |
| 2017/0358279 | A1 * | 12/2017 | Simha ....................... G06T 1/20 |
| 2018/0285174 | A1 * | 10/2018 | Che .......................... G06F 9/546 |

OTHER PUBLICATIONS

Sangman Kim, Seonggu Huh, Yige Hu, Xinya Zhang, Emmett Witchel, Amir Wated, and Mark Silberstein; GPUnet: Networking Abstractions for GPU Programs; Oct. 2014; 17 pages (Year: 2014).*
Feras Daoud et al; GPUrdma: GPU-side library for high performance networking from GPU kernels; Jun. 1, 2016; 8 pages (Year: 2016).*

(Continued)

*Primary Examiner* — S. Sough
*Assistant Examiner* — Kimberly L Jordan
(74) *Attorney, Agent, or Firm* — Kowert Hood Munyon Rankin and Goetzel PC; Rory D. Rankin (57) ABSTRACT

Systems, apparatuses, and methods for generating network messages on a parallel processor are disclosed. A system includes at least a parallel processor, a general purpose processor, and a network interface unit. The parallel processor includes at least a plurality of compute units, a command processor, and a cache. A thread within a kernel executing on a compute unit of the parallel processor generates a network message and stores the network message and a corresponding indication in the cache. In response to detecting the indication of the network message in the cache, the command processor processes and conveys the network message to the network interface unit without involving the general purpose processor.

20 Claims, 6 Drawing Sheets

(56) References Cited

OTHER PUBLICATIONS

Marc S. Orr et al; Gravel: Fine-Grain GPU-Initiated Network Messages; Archived Sep. 10, 2017; https://web.archive.org/web/20170910131829/https://research.cs.wisc.edu/multifacet/papers/sc17_gravel.pdf; 12 pages (Year: 2017).*

Michael LeBeane et al; GPU Triggered Networking for Intra-Kernel Communications; Nov. 12-17, 2017; 12 pages (Year: 2017).*

* cited by examiner

GPU NETWORKING USING AN INTEGRATED COMMAND PROCESSOR

BACKGROUND

Description of the Related Art

A general-purpose processor, such as a central processing unit (CPU), typically performs input/output (I/O) operations for a software application. In a system that includes multiple processors, the CPU might be the only processor that can generate network messages. The system can also include a data parallel processor in addition to the general-purpose processor. The data parallel processor has a highly parallel execution architecture. Data parallel processors can include graphics processing units (GPUs), digital signal processors (DSPs), and so forth. A data parallel processor incurs delays in computations while waiting for the CPU to coordinate network communication on its behalf. In a computing system with a CPU and a GPU, the CPU is often referred to as "the host". Current GPU networking applications either require the host to pre-register or initiate network messages on behalf of the GPU. Using the host to generate network messages for the GPU can potentially involve several back-to-back round trips from the GPU to the host and from the host to the network interface, resulting in a reduction in performance.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for generating network messages directly from a parallel processor are disclosed herein. In one embodiment, a system includes at least a first processor, a second processor, and a network interface unit. In one embodiment, the first processor is a central processing unit (CPU) and the second processor is a graphics processing unit (GPU). In other embodiments, the second processor can be other types of processing units (e.g., application specific integrated circuit (ASIC), field programmable gate array (FPGA), digital signal processor (DSP)). In one embodiment, the second processor includes at least a command processor, one or more compute units, and one or more caches.

In one embodiment, the second processor is configured to generate a network message within a kernel executing on a compute unit. As used herein, the term "kernel" or "compute kernel" is defined as a function or task comprising executable instructions that are launched and executed as one or more threads on one or more compute units. A thread of the kernel stores an indication of the network message in the cache. In one embodiment, the thread of the kernel dynamically determines a target address of the network message during runtime. In response to detecting the indication of the network message in the cache, the command processor processes the network message without involving the first processor. It is noted that the command processor processes the network message prior to the kernel completing execution. Then, the command processor conveys the network message to a network interface unit.

Figure 1:
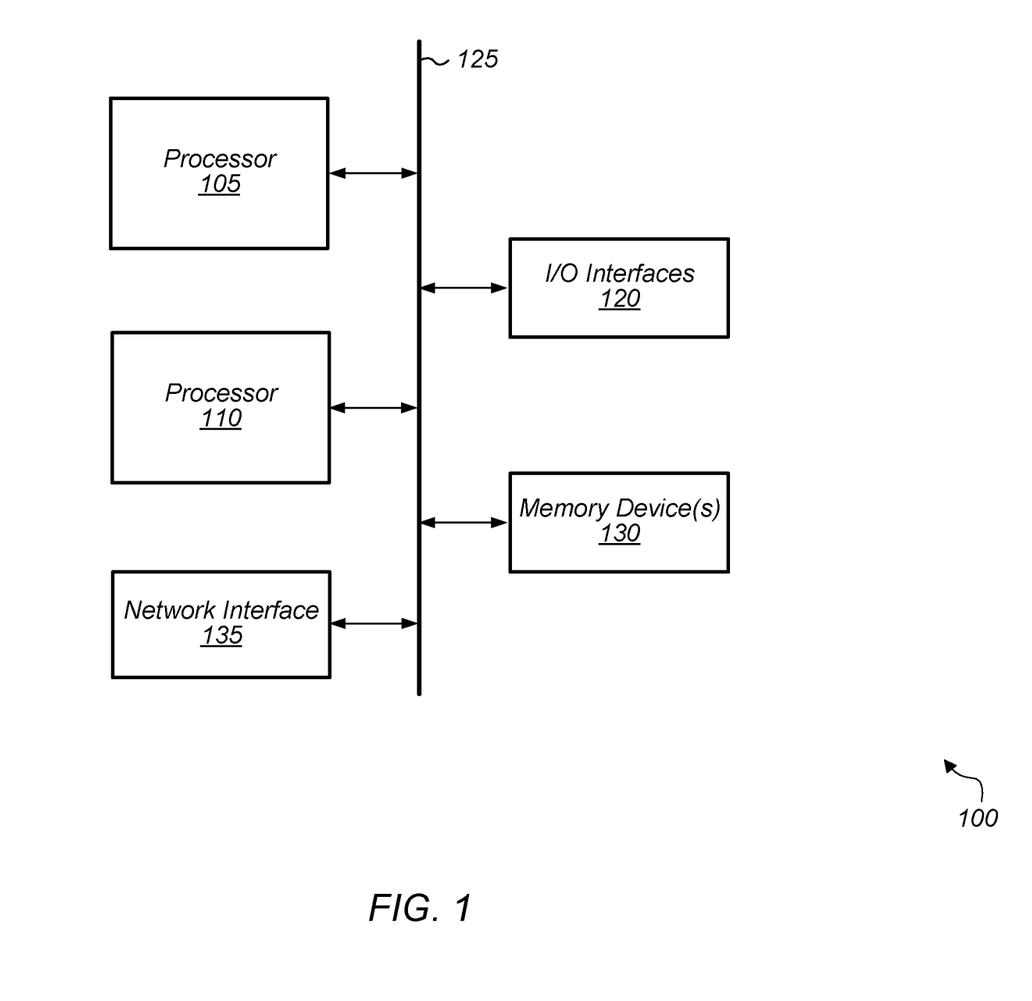
FIG. 1 is a block diagram of one embodiment of a computing system.

Referring now to FIG. 1, a block diagram of one embodiment of a computing system 100 is shown. In one embodiment, computing system 100 includes at least processor 105, processor 110, input/output (I/O) interfaces 120, bus 125, memory device(s) 130, and network interface 135. In other embodiments, computing system 100 can include other components and/or computing system 100 can be arranged differently.

In one embodiment, processor 105 is a general purpose processor, such as a central processing unit (CPU). In this embodiment, processor 110 is a data parallel processor with a highly parallel architecture. It is noted that system 100 can also include other data parallel processors in addition to processor 110. Data parallel processors can include graphics processing units (GPUs), digital signal processors (DSPs), and so forth. Network interface 135 is used to receive and send network messages across a network. Threads executing on the data parallel processor 110 generate and store network messages in a local cache or internal memory. A command processor of the data parallel processor 110 supports remote direct memory access (RDMA) networking directly from data parallel processor 110 without requiring any interaction between general purpose processor 105 and data parallel processor 110. In one embodiment, the command processor sends the network messages directly to network interface 135 to send across a network, without any involvement from processor 105. In one embodiment, the command processor builds and initiates network operations using a low-level networking runtime, such as InfiniBand® Verbs.

Memory device(s) 130 are representative of any number and type of memory devices. For example, the type of memory in memory device(s) 130 can include Dynamic Random Access Memory (DRAM), Static Random Access Memory (SRAM), NAND Flash memory, NOR flash memory, Ferroelectric Random Access Memory (FeRAM), or others. Memory device(s) 130 are accessible by inference engine 105 and processor(s) 110. I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices can be coupled to I/O interfaces 120. Such peripheral devices include (but are not limited to) displays, keyboards, mice, printers, scanners, joysticks or other types of game controllers, media recording devices, external storage devices, network interface cards, and so forth.

In various embodiments, computing system 100 can be a computer, laptop, node of a multi-node system, mobile device, game console, server, streaming device, wearable device, or any of various other types of computing systems or devices. It is noted that the number of components of computing system 100 can vary from embodiment to embodiment. There can be more or fewer of each component/subcomponent than the number shown in FIG. 1. It is also noted that computing system 100 can include other components not shown in FIG. 1. Additionally, in other embodiments, computing system 100 can be structured in other ways than shown in FIG. 1.

Figure 2:
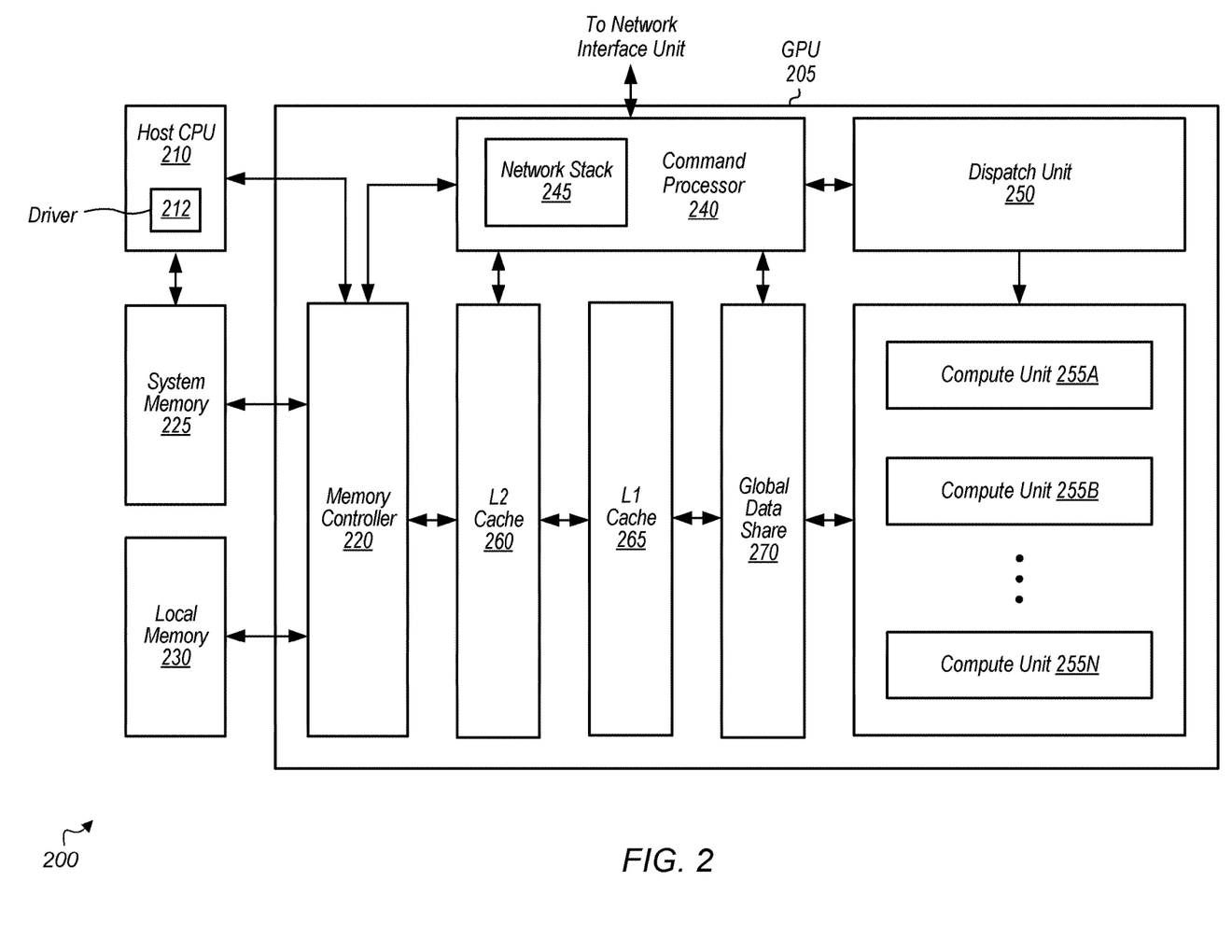
FIG. 2 is a block diagram of another embodiment of a computing system.

Turning now to FIG. 2, a block diagram of another embodiment of a computing system 200 is shown. In one embodiment, system 200 includes GPU 205, host CPU 210, system memory 225, and local memory 230. System 200 also includes other components which are not shown to avoid obscuring the figure. An application executes on host CPU 210 and interfaces with driver 212 to send program commands and data to GPU 205. Host CPU 210 is coupled to memory controller 220 and system memory 225. GPU 205 includes at least command processor 240, dispatch unit 250, compute units 255A-N, memory controller 220, global data share 270, level one (L1) cache 265, and level two (L2) cache 260. In other embodiments, GPU 205 can include other components, omit one or more of the illustrated components, and/or be organized in other suitable manners.

Global data share 270, L1 cache 265, and L2 cache 260 of GPU 205 represent the term "internal memory" of GPU 205 as used herein. The internal memory is differentiated from external memory to GPU 205, with system memory 225 and local memory 230 representing the term "external memory" of GPU 205 as used herein. In the execution of various applications, threads executing on compute units 255A-N are configured to generate network messages and convey indications of the network messages to command processor 240 via the internal memory of GPU 205.

In various embodiments, computing system 200 is configured to implement any of various types of software applications. For example, in one embodiment, computing system 200 is configured to execute applications that implement intra-kernel networking. An application executing on host CPU 210 utilizes driver 212 to send data and commands to GPU 205. Command processor 240 is configured to receive commands from host CPU 210 and utilize dispatch unit 250 to issue commands to compute units 255A-N. Threads within kernels executing on compute units 255A-N are configured to read and write data to global data share 270, L1 cache 265, and L2 cache 260 within GPU 205. Although not shown in FIG. 2, compute units 255A-N can also include one or more caches and/or local memories within each compute unit 255A-N. These caches and/or local memories can also be included in the designation of the "internal memory" of GPU 205.

In various embodiments, multiple threads of the kernel can execute in parallel (e.g., in lockstep) on compute units 255A-N. In one embodiment, each thread executes the kernel using a unique thread identifier (ID). In one embodiment, each thread is launched on a separate compute unit 255A-N. As used herein, the term "thread" is defined as a sequence of programmed instructions that are managed independently by a scheduler. Also, the term "thread" can be defined as an execution context which includes the information a processing unit needs to execute a stream of instructions. The execution context consists of the values of the processing unit's registers. It is noted that a "thread" can also be referred to as a "work-item".

Command processor 240 is configured to perform a variety of tasks for GPU 205. For example, command processor 240 schedules compute tasks, data movement operations through direct memory access (DMA), and various post-kernel clean-up activities. In the embodiment shown in FIG. 2, command processor 240 executes network runtime code of network stack 245 to process network operations generated by threads executing on compute units 255A-N. In one embodiment, each thread is configured to dynamically generate a network message and dynamically determine a target address of the network message. Command processor 240 is configured to detect, process, and send the network messages to a network interface unit (not shown).

Figure 3:
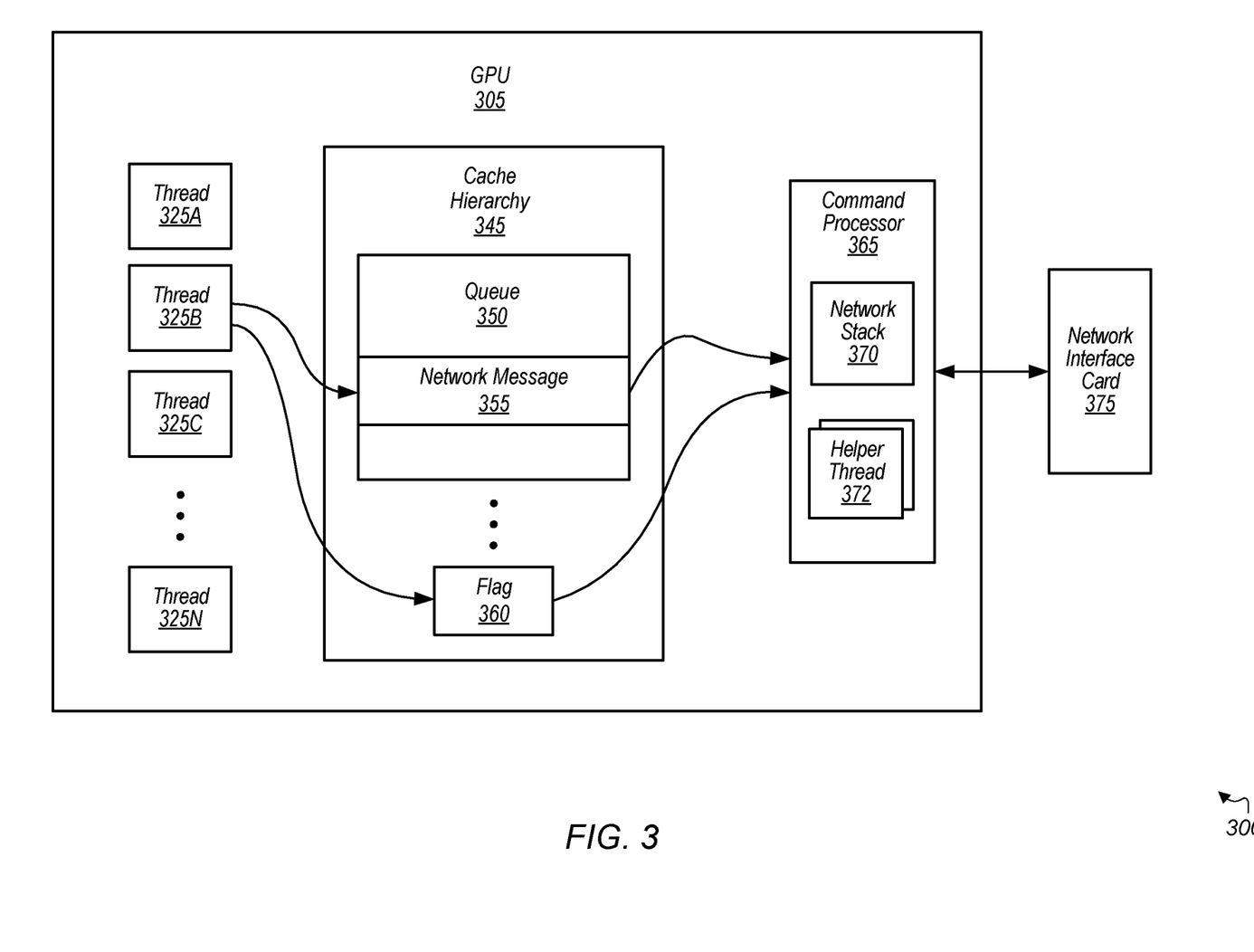
FIG. 3 is a block diagram of one embodiment of a computing system with a GPU.

Referring now to FIG. 3, a block diagram of one embodiment of a computing system 300 with a GPU 305 is shown. In one embodiment, GPU 305 includes a plurality of threads 325A-N executing on the compute units (not shown) of GPU 305. Threads 325A-N are representative of any number of threads, with the number varying according to the embodiment and during the different phases of the application being executed by system 300 and GPU 305. GPU 305 also includes command processor 365 to schedule tasks, launch kernels, and manage the completion of kernels. In one embodiment, command processor 365 includes network stack 370 to facilitate network communication with network interface card (NIC) 375. It is noted that NIC 375 can also be referred to as a "network interface unit" or a "network interface".

NIC 375 includes circuitry and logic for communicating with other processing nodes across a network. For example, NIC 375 can utilize logic to communicate with a physical layer and a data link layer standard such as Ethernet, Fibre Channel, Wi-Fi or Token Ring. NIC 375 can communicate with a group of close by computers on a same local area network (LAN). Additionally, NIC 375 can communicate with other nodes across a network. NIC 375 can include a network protocol stack such as a Hypertext Transfer Protocol (HTTP) for an application layer, a Transmission Control Protocol (TCP) for a transport layer, an Internet Protocol (IP) for an internet layer, an Ethernet protocol for a data link layer, and an IEEE 802.3u protocol for a physical layer.

GPU 305 also includes cache hierarchy 345 which can include any numbers and levels of caches. In one embodiment, threads 325A-N use the storage locations of cache hierarchy 345 to communicate with command processor 365. For example, thread 325B stores a flag 360 in a given location of cache hierarchy 345 to inform command processor 365 that thread 325B is initiating a network message. Also, thread 325B stores a network message 355 in queue 350 of cache hierarchy 345 to pass network message 355 to command processor 365. Network message 355 can include a command and a payload. It is noted that thread 325B does not have to wait until a kernel boundary to store flag 360 and network message 355 in cache hierarchy 345. Rather, thread 325B can store flag 360 and network message 355 in cache hierarchy 345 while a kernel is running. Accordingly, any of the threads 325A-N can generate multiple network messages and have these network messages processed by command processor 365 within a single kernel. In one embodiment, each thread 325 has an assigned location, for storing flag 360 to indicate a pending network message, which is different from the assigned locations of the other threads 325A-N.

In one embodiment, command processor 365 includes a plurality of helper threads 372 which execute various tasks and monitor storage locations within cache hierarchy 345. When a given helper thread 372 detects the flag 360 set by thread 325B, then command processor 365 retrieves network message 355 from queue 350. Then, command processor 365 translates a first command of network message 355 into a second command which is compatible with NIC 375. Next, command processor 365 sends the second command and the payload to NIC 375 to initiate the network communications corresponding to network message 355. It is noted that the network message 355 is processed and conveyed to NIC 375 without the involvement of a host (not shown). This helps to increase the efficiency of network communications performed by threads 325A-N of GPU 305 by not passing the communications through the host.

Figure 4:
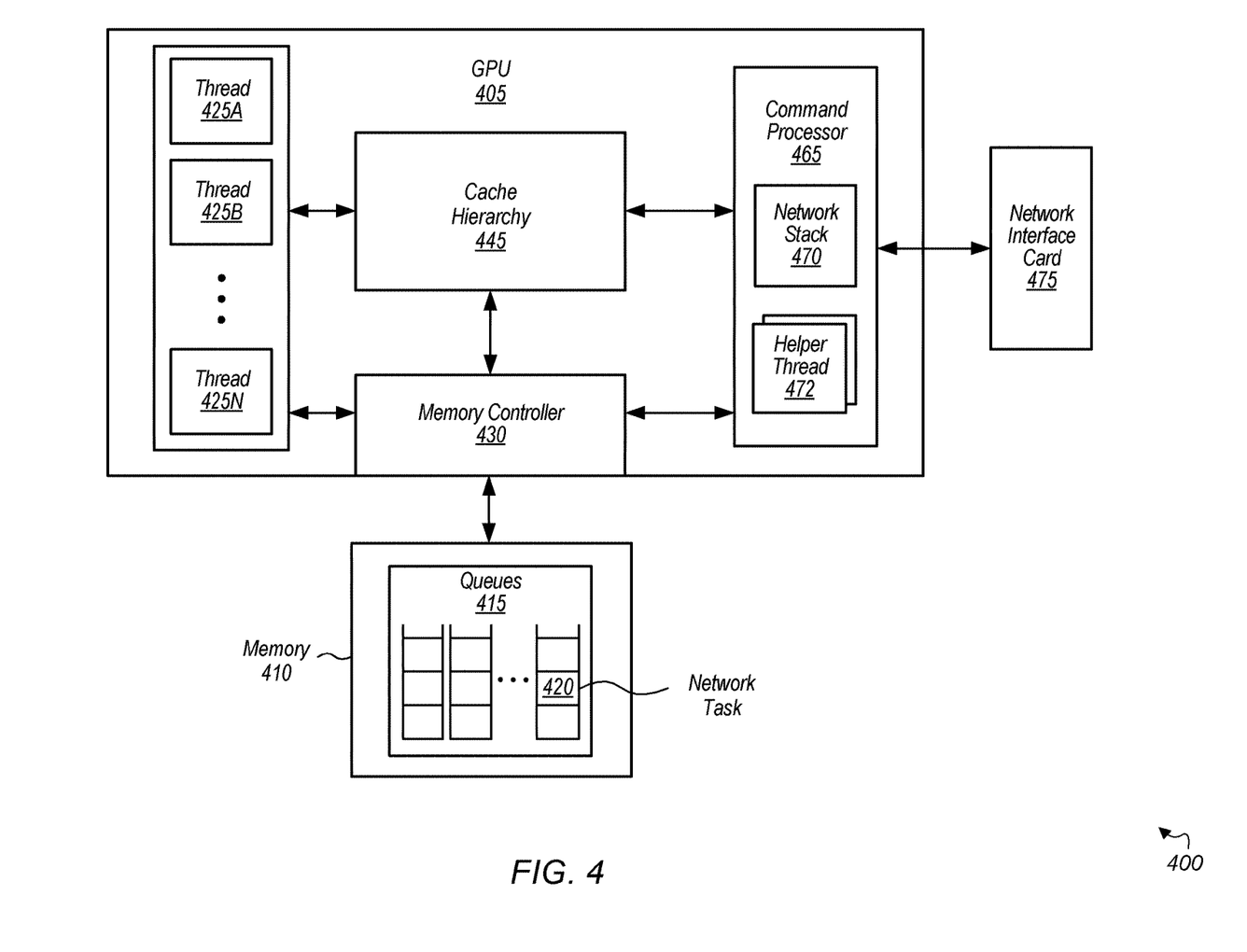
FIG. 4 is a block diagram of another embodiment of a computing system with a GPU.

Turning now to FIG. 4, a block diagram of another embodiment of a system 400 with a GPU 405 for performing network communication directly by the GPU 405 is shown. In one embodiment, GPU 405 includes threads 425A-N executing on various execution hardware (e.g., compute units), cache hierarchy 445, memory controller 430, and command processor 465. Memory controller 430 is coupled to memory 410, and command processor 465 is coupled to network interface card 475. Command processor 465 includes at least network stack 470 and helper threads 472, which are representative of any number of helper threads. It is noted that system 400 and GPU 405 can include other components which are not shown to avoid obscuring the figure.

Network stack 470 can include a multi-layer software stack for network communications. Network stack 470 can implement a Transmission Control Protocol (TCP), User Datagram Protocol (UDP), or related protocols included in an Internet Protocol (IP) suite. Network stack 470 can include other network, transport, and/or link layers, or other abstraction layers, for example, which comply with the Open Systems Interconnection (OSI) model. For example, a link layer of the network stack 470 can attach source and destination media access control (MAC) addresses, allowing data packets to be directed to a specific network interface on network interface card 475.

In one embodiment, when a given thread 425 wants to generate a network message, the given thread 425 enqueues a network task 420 in one of task queues 415 stored in memory 410. It is noted that the given thread 425 can enqueue network task 420 in a task queue 415 prior to the kernel completing execution. A given helper thread 472 of command processor 465 will detect the network task 420 stored in a task queue 415, and then command processor 465 will generate a network message and convey the network message to network interface card 475.

Figure 5:
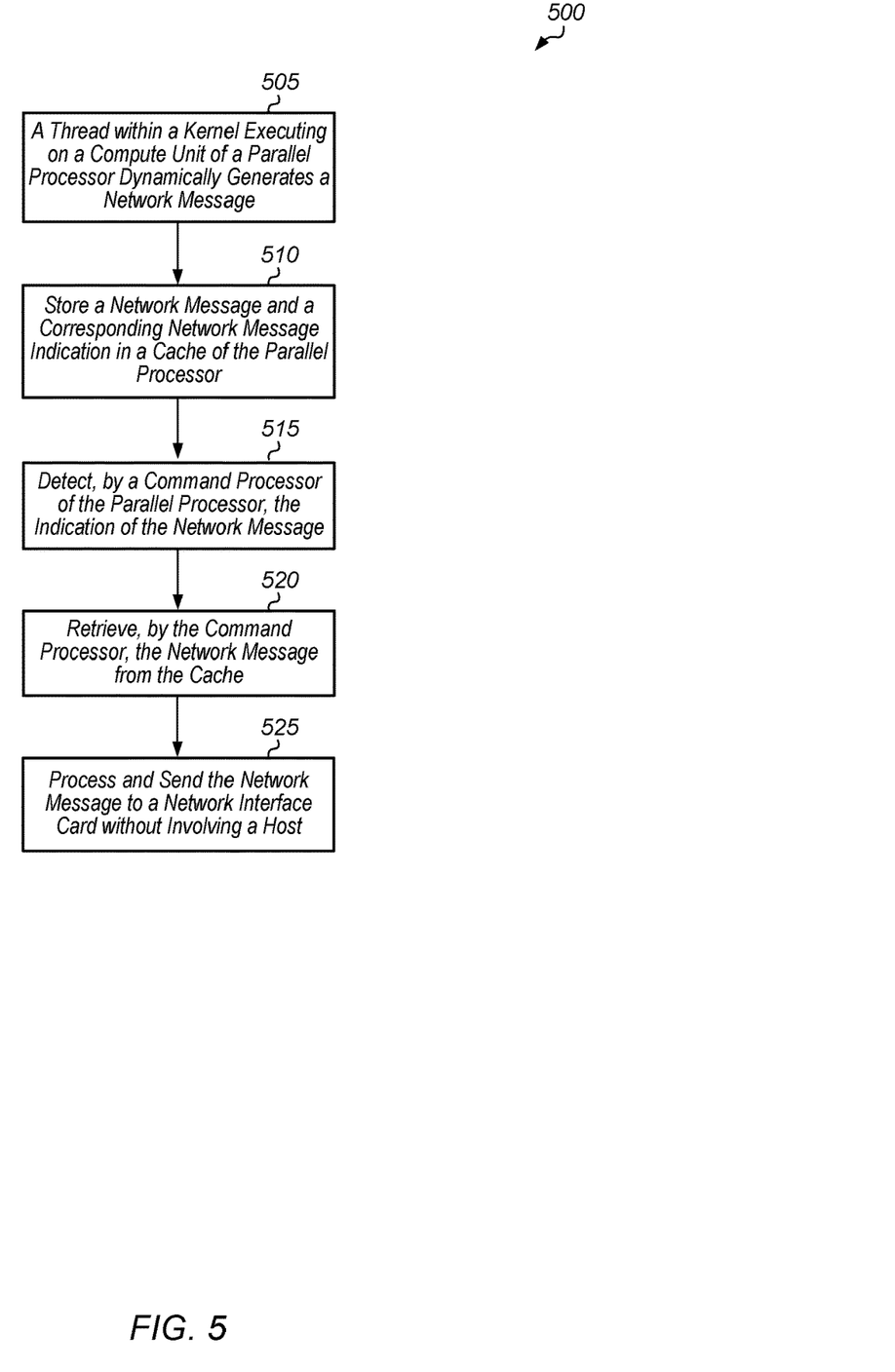
FIG. 5 is a generalized flow diagram illustrating one embodiment of a method for generating a network message within a parallel processor.
Figure 6:
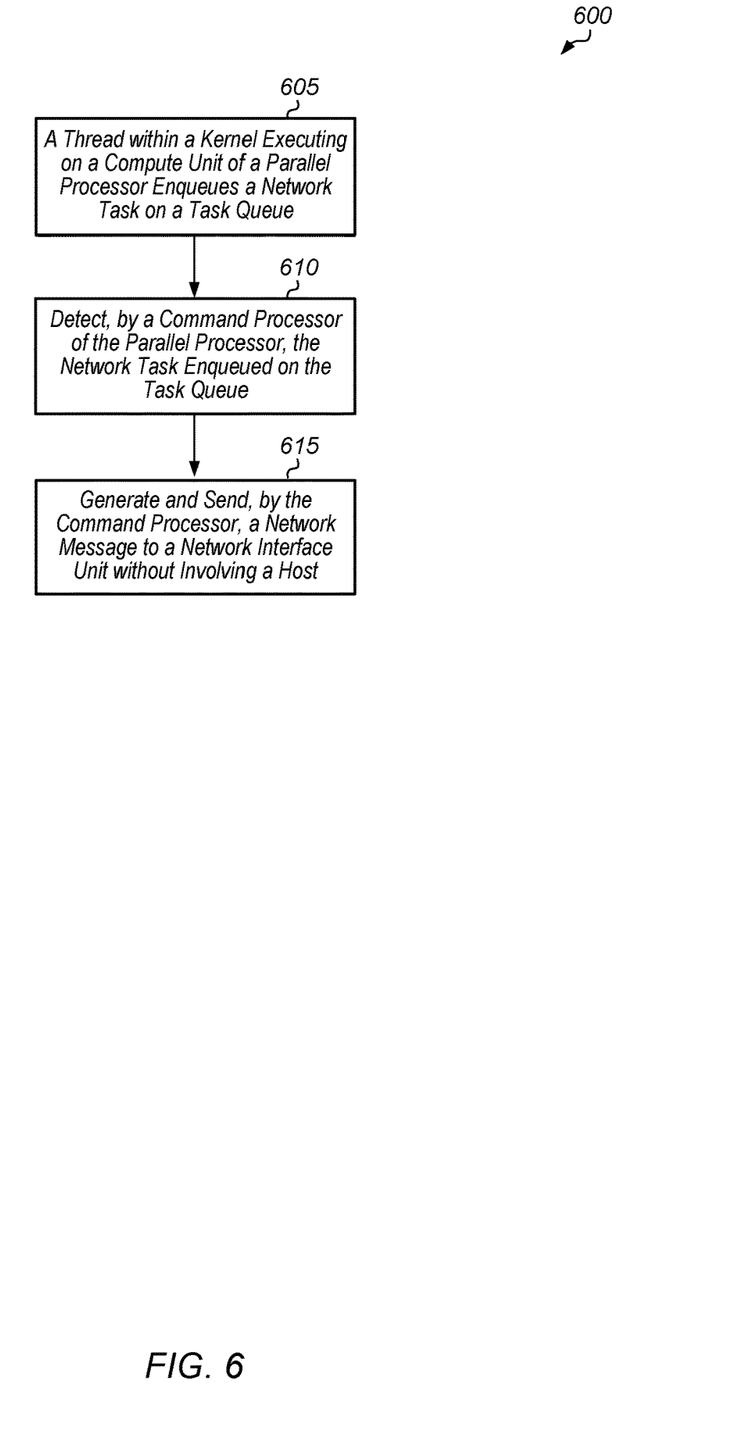
FIG. 6 is a generalized flow diagram illustrating another embodiment of a method for generating a network message within a parallel processor.

Referring now to FIG. 5, one embodiment of a method 500 for generating a network message within a parallel processor is shown. For purposes of discussion, the steps in this embodiment and those of FIG. 6 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A thread within a kernel executing on a compute unit of a parallel processor dynamically generates a network message (block 505). In one embodiment, the thread dynamically generates the network messages based on internal computations performed by the thread. The parallel processor includes an internal memory with one or more caches, a command processor, compute units, and/or other logic. In one embodiment, the parallel processor is a GPU. In other embodiments, the parallel processor can be other types of processors (e.g., ASIC, FPGA, DSP). In one embodiment, the parallel processor is part of a system which also includes a general purpose processor.

The thread stores a network message and a corresponding network message indication in a cache of the parallel processor (block 510). For example, in one embodiment, the thread reserves space in a queue of the cache, stores the network message in the queue, and then stores an indication in the cache to notify the command processor that the network message is ready to be sent. A command processor of the parallel processor detects the indication of the network message (block 515). In response to detecting the indication of the network message, the command processor retrieves the network message from the cache (block 520). Next, the command processor processes and sends the network message to a NIC without involving a host (block 525). In one embodiment, the command processor generates commands which are recognizable by the NIC and then sends the commands and the network message to the NIC. After block 525, method 500 ends.

Turning now to FIG. 6, another embodiment of a method 600 for generating a network message within a parallel processor is shown. A thread within a kernel executing on a compute unit of a parallel processor enqueues a network task on a task queue (block 605). In one embodiment, the task queue is stored in a memory coupled to the parallel processor. Next, a command processor of the parallel processor detects the network task enqueued on the task queue (block 610). In response to detecting the network task enqueued on the task queue, the command processor generates and sends a network message to a network interface unit without involving a host (block 615). After block 615, method 600 ends.

In various embodiments, program instructions of a software application are used to implement the methods and/or mechanisms described herein. For example, program instructions executable by a general or special purpose processor are contemplated. In various embodiments, such program instructions can be represented by a high level programming language. In other embodiments, the program instructions can be compiled from a high level programming language to a binary, intermediate, or other form. Alternatively, program instructions can be written that describe the behavior or design of hardware. Such program instructions can be represented by a high-level programming language, such as C. Alternatively, a hardware design language (RDL) such as Verilog can be used. In various embodiments, the program instructions are stored on any of a variety of non-transitory computer readable storage mediums. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become appar-

What is claimed is:

1. A processor comprising:
 a command processor;
 a plurality of compute units; and
 a cache;
 wherein the processor is configured to:
  generate a network task within a kernel executing on a compute unit;
  store an indication of the network task in the cache;
  detect, by the command processor, the indication of the network task in the cache; and
  process, by the command processor without involving any external host processor, the network task to generate a network message comprising a payload and a first command that is compatible with a network communication protocol of a network interface unit.

2. The processor as recited in claim 1, wherein the command processor is further configured to attach, to the network message, source and destination media access control (MAC) addresses, allowing the network message to be directed to a specific network interface on a network interface card.

3. The processor as recited in claim 2, wherein the command processor is further configured to process the network task by translating a second command of the network task to the first command of the network message different from the second command by using a network stack that supports the network communication protocol of the network interface card.

4. The processor as recited in claim 1, wherein the processor is further configured to convey, using the network communication protocol, the payload and the first command of the network message directly to the network interface unit by bypassing any external host processor.

5. The processor as recited in claim 1, wherein a thread of the kernel is configured to dynamically determine a target address of the network message.

6. The processor as recited in claim 1, wherein the command processor is configured to attach a source address and a destination address to the network message based on a link layer of a network stack.

7. The processor as recited in claim 1, wherein the processor is a graphics processing unit (GPU).

8. A method comprising:
 generating, by a compute unit of a parallel processor, a network task within a kernel executing on the compute unit of the parallel processor;
 storing, by the compute unit, an indication of the network task in a cache of the parallel processor;
 detecting, by a command processor of the parallel processor, the indication of the network task in the cache; and
 processing, by the command processor without involving any external processor, the network task to generate a network message comprising a payload and a first command that is compatible with a network communication protocol of a network interface unit.

9. The method as recited in claim 8, further comprising attaching, to the network message by the command processor, source and destination media access control (MAC) addresses, allowing the network message to be directed to a specific network interface on a network interface card.

10. The method as recited in claim 9, further comprising processing, by the command processor, the network task by translating a second command of the network task to the first command of the network message different from the second command by using a network stack that supports the network communication protocol of the network interface card.

11. The method as recited in claim 8, further comprising conveying, by the parallel processor using the network communication protocol, the payload and the first command of the network message directly to the network interface unit by bypassing any external host processor.

12. The method as recited in claim 8, further comprising dynamically determining, by a thread of the kernel, a target address of the network message.

13. The method as recited in claim 8, further comprising attaching, by the command processor, a source address and a destination address to the network message based on a link layer of a network stack.

14. The method as recited in claim 8, wherein the parallel processor is a graphics processing unit (GPU).

15. An apparatus comprising:
 a first processor;
 a second processor, wherein the second processor comprises a command processor, a plurality of compute units, and a cache; and
 a network interface unit;
 wherein the second processor is configured to:
  generate a network task within a kernel executing on a compute unit;
  store an indication of the network task in the cache;
  detect, by the command processor, the indication of the network task in the cache; and
  process, by the command processor without involving the first processor, the network task to generate a network message comprising a payload and a first command that is compatible with a network communication protocol of the network interface unit.

16. The apparatus as recited in claim 15, wherein the command processor is further configured to attach, to the network message, source and destination media access control (MAC) addresses, allowing the network message to be directed to a specific network interface on a network interface card.

17. The apparatus as recited in claim 16, wherein the command processor is further configured to process the network task by translating a second command of the network task to the first command of the network message different from the second command by using a network stack that supports the network communication protocol of the network interface card.

18. The apparatus as recited in claim 15, wherein the second processor is further configured to convey, using the network communication protocol, the payload and the first command of the network message directly to the network interface unit by bypassing the first processor.

19. The apparatus as recited in claim 15, wherein a thread of the kernel is configured to dynamically determine a target address of the network message.

20. The apparatus as recited in claim 15, wherein the command processor is configured to attach a source address and a destination address to the network message based on a link layer of a network stack.

* * * * *